May 11, 1926. 1,584,292
R. M. HAWN
MOTOR BUS
Filed April 8, 1922 3 Sheets-Sheet 1
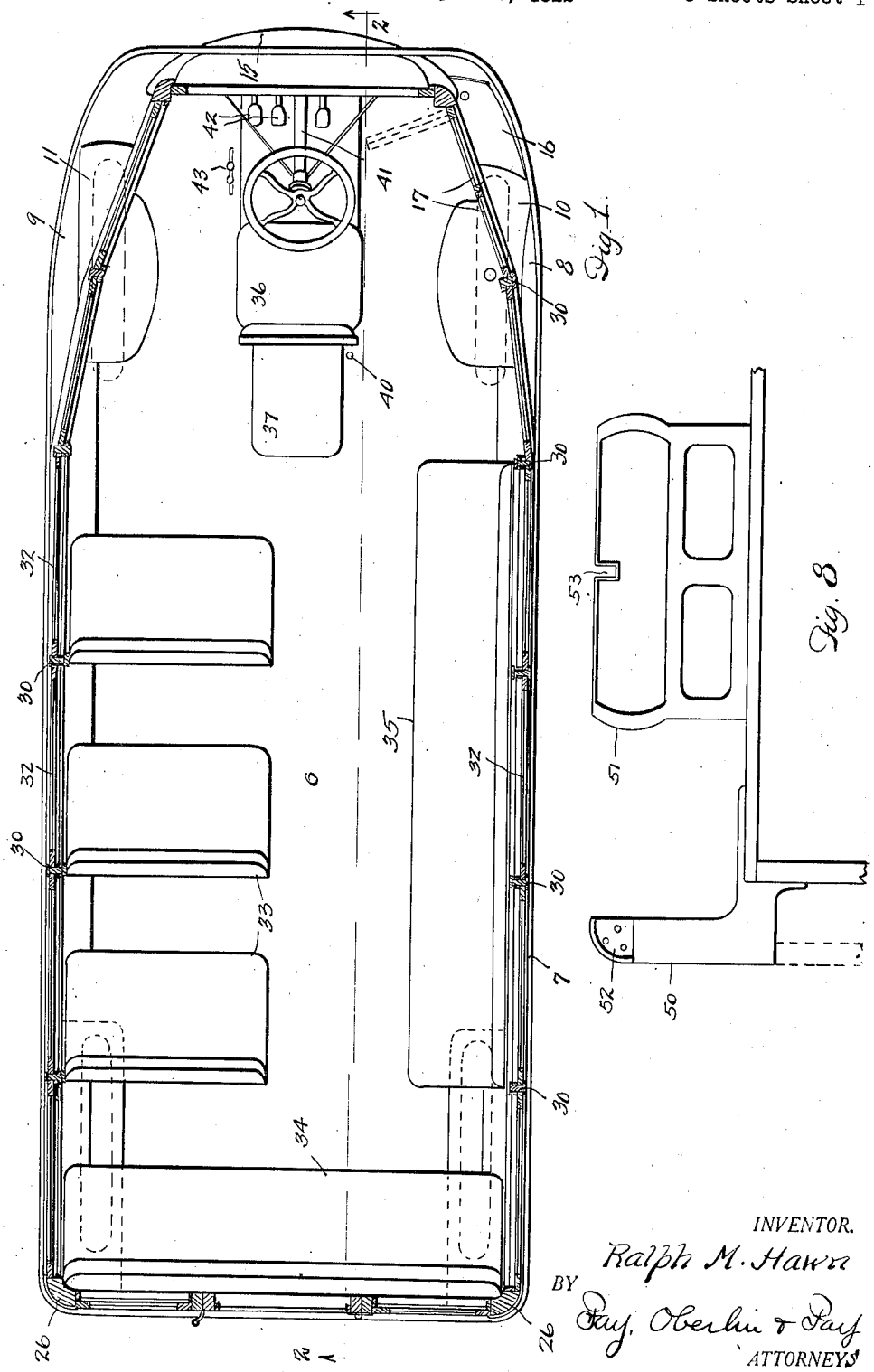
INVENTOR.
Ralph M. Hawn
BY
Fay, Oberlin & Fay
ATTORNEYS May 11, 1926.　　　　　　　　　　　　1,584,292
R. M. HAWN
MOTOR BUS
Filed April 8, 1922　　　　3 Sheets-Sheet 2
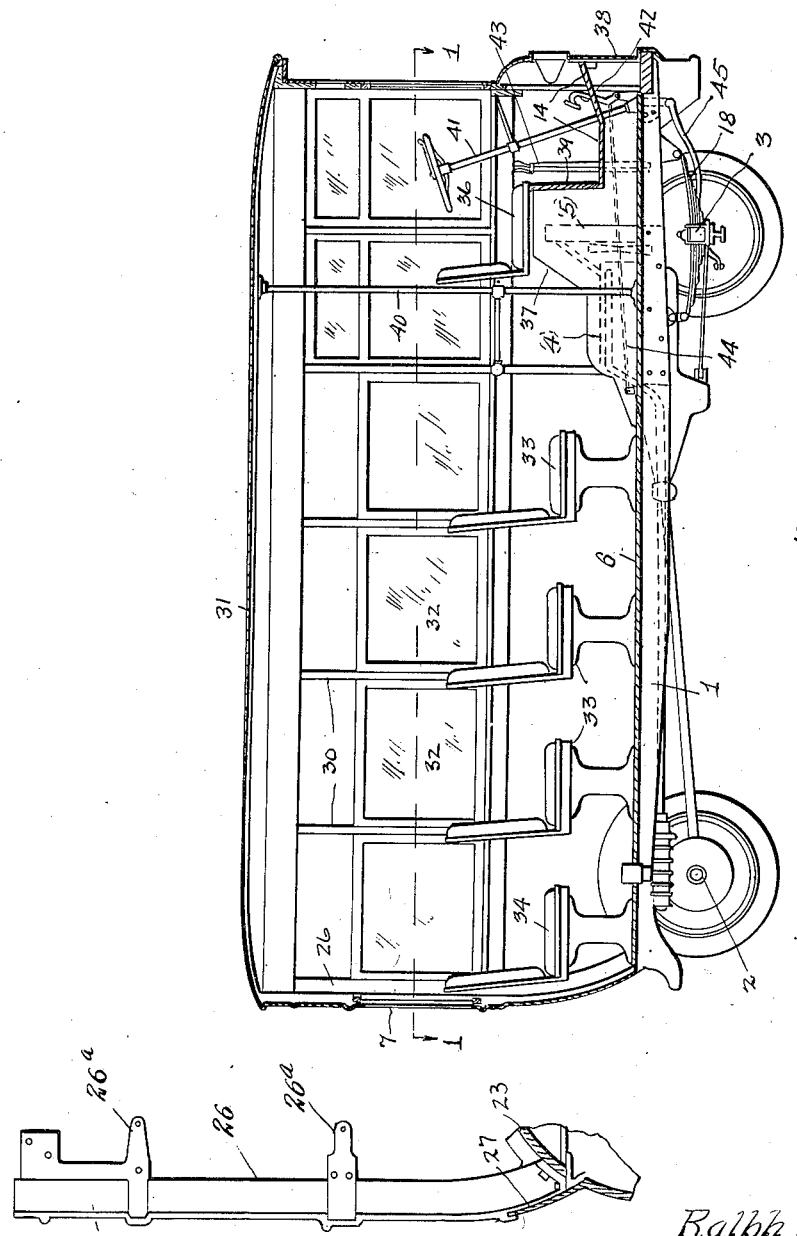
INVENTOR.
Ralph M. Hawn
BY
Fay, Oberlin & Fay
ATTORNEYS

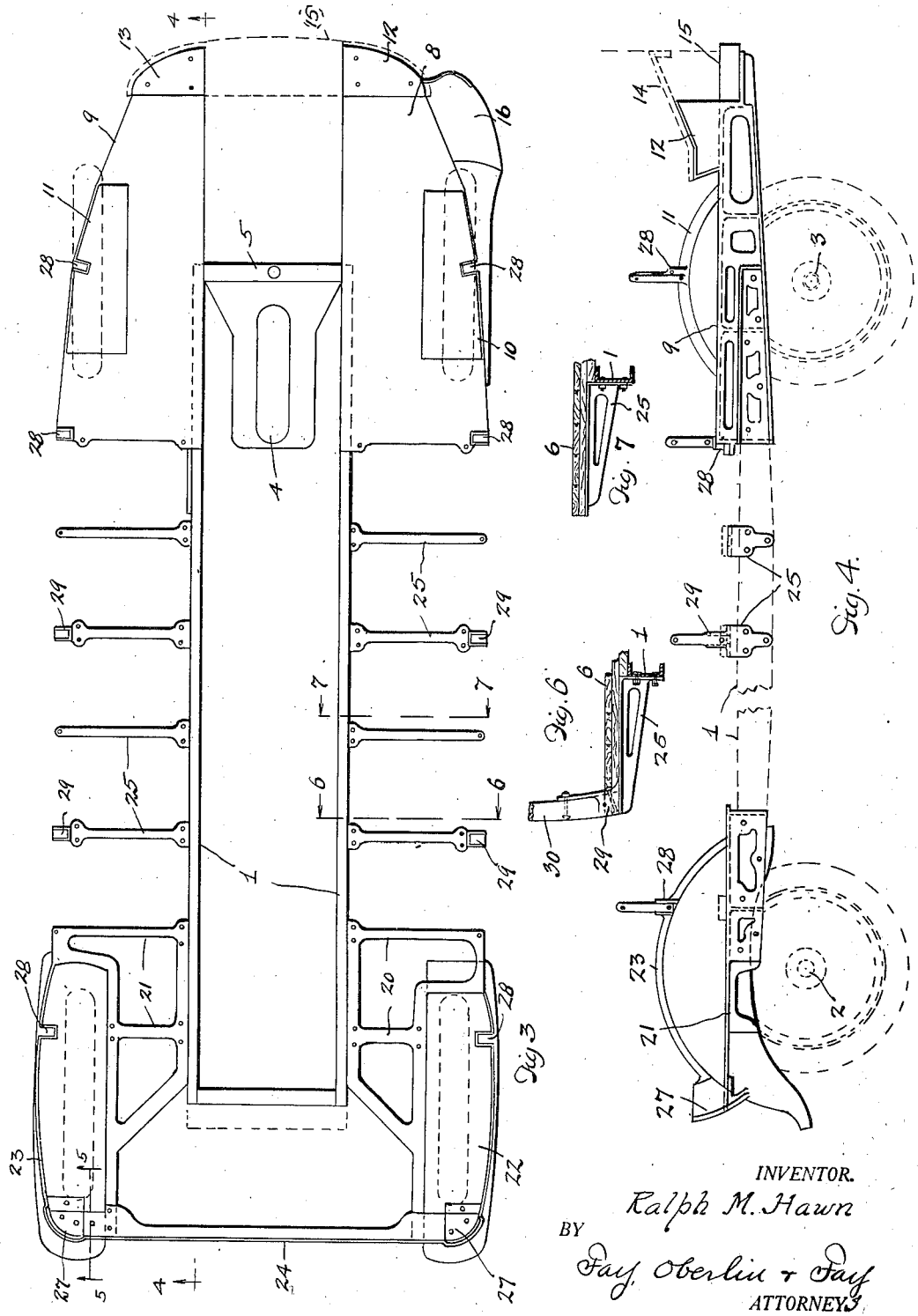

Patented May 11, 1926.

1,584,292

UNITED STATES PATENT OFFICE.

RALPH M. HAWN, OF CLEVELAND, OHIO, ASSIGNOR OF ONE-HALF TO ALBERT M. ALLEN, OF CLEVELAND, OHIO.

MOTOR BUS.

Application filed April 8, 1922. Serial No. 550,651.

The object of the present invention is to provide a motor chassis specifically adapted to support a vehicle body of any desired type, in contradistinction to the utilization of existing truck chassis designs currently employed in this connection. A further object of the invention is to provide a vehicle structure that will combine maximum strength with minimum weight and that will render possible the construction of an omnibus or other commercial vehicle at a reasonable cost that will nevertheless afford the public safe, comfortable and efficient means of transportation.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is a plan view of an omnibus incorporating my present improvements, the body of the bus being shown in section on a plane above the level of the seats; Fig. 2 is a longitudinal vertical section of the same, the plane of the section being indicated by the line 2—2, Fig. 1; Fig. 3 is a plan view of the frame or skeleton of the chassis; Fig. 4 is a broken elevation of such chassis frame, as viewed from the plane indicated by the line 4—4, Fig. 3; Figs. 5, 6 and 7 are fragmentary sectional views of the same, taken on the vertical planes indicated by the lines 5—5, 6—6 and 7—7, Fig. 3, respectively, and Fig. 8 is a broken plan view similar to Fig. 3, but showing a modification.

While, as previously indicated, my improved motor vehicle embodies a special chassis, the design of such chassis is preferably made such that a truck chassis of standard make, such, for example, as one made by Ford, White, Reo, or other manufacturer, may be utilized as its base. There is, however, nothing in the design to prevent the construction of the chassis in its entirety, especially for my improved motor vehicle. Irrespective of whether I make an adaptation of an existing chassis, or build an entirely new one, the construction thereof is made such that the load is more evenly distributed on the four wheels of the truck than is now possible in the various designs of commercial motor vehicles currently in use. To this end I arrange the chassis so as to permit the driver to operate the vehicle from a position over, alongside of or in front of the engine without changing the location of the latter or requiring an engine of any different construction from that regularly used on motor trucks of the standard types, above referred to, to be substituted. Ordinarily even in the very latest design of chassis, especially designed for bus service, (see Automotive Industries issue of March 23, 1922, page 655) the fore part of such chassis remains unchanged from that regularly used in motor truck design, i. e., the driver's seat with operating and steering mechanism, etc., remain in a position in the waist of the car where, irrespective of the type of body employed, valuable space is lost, and in order to obtain suitable carrying capacity, the rear end of the body requires to be extended unduly beyond the rear axle.

As best shown in Fig. 3, the present improved chassis comprises a main frame 1 that corresponds with the frame usually found in a motor truck of standard design. The front and rear axles 2 and 3 (see Figs. 2 and 4) are retained in the same relative position to such frame that they occupy in the ordinary truck chassis; indeed they may be the identical actual units employed in the latter, although where a Ford one-ton truck is utilized as the base of my motor vehicle, I preferably substitute a somewhat heavier front axle for the one that is standard in said truck. The motor or engine 4 with its radiator 5 remains unchanged, as just explained, and the driving connections, including gear shift, etc., between the motor and the rear axle 2 are likewise unchanged. The control elements, however, including foot pedals, steering column and brake levers, are removed from their positions immediately in the rear of the engine to a location forwardly thereof, as will be presently explained.

For the purpose of supporting the floor 6 of the vehicle body 7 (Figs. 1 and 2) I provide, in the first place, a forwardly projecting extension of the main frame 1, such extension preferably consisting, as shown, of cast or otherwise fabricated right and left front fender members 8 and 9, that are attached to the respective sides of the front end of said main frame. The upper surfaces of these front fender or extension members save for integral raised and suitable curved fenders proper 10 and 11 that correspond in location with the front wheels are substantially flat and are adapted to support a floor substantially flush with a floor laid directly on said main frame. Said members 8 and 9 also carry upwardly projecting brackets 12 and 13 that are suitably inclined to receive and support the foot boards 14 which form the floor of the driver's compartment (see Fig. 2). Said members 8 and 9 are furthermore transversely braced by means of a bumper 15 that joins their extreme forward ends and one of said members, preferably the one on the right, is formed with an integral step 16 by means of which the operator, or passengers in case the vehicle is designed for omnibus service may enter and leave the body 7, the latter being provided with a folding door 17 immediately adjacent such step.

The projecting part of said fender members 8 and 9 also provide adequate means for connecting or resting the same on the forward ends of the front springs 18.

Said members are, of course, designed in such a manner as will admit of securing them rigidly to the longitudinal members of the main chassis frame 1 and extend rearwardly alongside of said frame members for some distance. Where thus carried to a point beyond the points of attachment of the rear ends of front springs 18, suitable means are provided for attaching such rear ends by shackles or otherwise to said fender members.

At the respective rear corners of the main frame 1 right and left fender members 20 and 21, similar in character to members 8 and 9, are attached to said frame, said rear members being preferably in the form of light metal castings and including integrally therewith the fenders 22 and 23 proper. A transverse bar or channel 24 joins the members 20 and 21 together and constitutes the rearmost part of the skeleton frame on which the vehicle body 7 is built.

Intermediately between the front and rear fender members a series of brackets or outriggers 25 are attached to the side members of the main frame 1 projecting laterally therefrom, as shown in Figs. 3, 6 and 7, to form a support for the portion of the floor 6 that lies outside said main frame.

The rear corner posts 26 are rigidly secured to the appropriate corners of rear fender members 20 and 21 preferably by being stepped into sockets 27 on said members and said fender members are provided forwardly of the corners in question with other sockets 28, and the front fender members with similar sockets that along with other sockets 29 provided in certain of the brackets 25 are adapted to receive a series of stanchions 30 that form the side supports for the roof 31 of the omnibus body and act as pillars between which the windows 32 may be guided. Said corner posts 26 are provided with laterally projecting arms or straps 26ª, to which the horizontal side members of the body frame may be attached.

The character and disposition of seats within the vehicle body when used for omnibus service may be varied to suit the character of the service and the size of the body. As shown, a series of short, transverse seats 33, along one side of the body, is combined with a wide seat 34 extending entirely across the rear of such body and another long seat 35 extending longitudinally along the remaining side. Where the fenders proper project above the floor line, they serve as a portion of the floor, their location being such as to interfere to a minimum degree with the seating of the passengers.

Preferably the driver's seat 36 is located centrally of the forward end of the body directly over radiator 5, the latter, together with the engine 4, being enclosed in a suitable housing 37 (see Fig. 2), the rear portion of which only will project within the body of the vehicle beyond said seat 36. This housing will effectually protect the passengers from contact with the engine and at the same time serve to direct the air from the radiator fan over the engine and downwardly to the rear of the same after the fashion of the hood ordinarily used on motor cars and trucks. Such air will be drawn in under foot boards 14 through a screen 38 at the extreme forward end of the body, a vertical drop board 39 closing the space between the seat 36 and said foot boards. Housing 37, it will be understood, will be movable, in whole or in part, so as to afford ready access to the engine when desired. One or more posts 40 adjacent the driver's seat 36 will be provided for the use of passengers in entering or leaving the car, and the space adjacent the driver's seat and the housing 37 may be utilized for the storage of baggage.

Whether a standard truck chassis be employed as the basis for my present improved construction or not, the necessary re-location of the control elements, including steering column 41, foot pedals 42 and brake lever 43, may be readily accomplished. Rods such as rod 44, for example, will serve to connect said foot pedal with the corresponding part of the gear set or clutch wherewith said pedal is connected when located to the rear of the engine instead of in front of the same; while a steering column 41 is similarly connected by a drag link 45 with the front wheel steering mechanism.

The use of cast or otherwise solidly fabricated metal fenders affords the builder with a rapid, economical and precise means of construction, doing away with heavy, cumbersome and unwieldy wooden under-framing, the stanchion and other upright frame members being stepped into and securely anchored in the sockets provided in the upper surfaces of said fenders, and the intermediate outriggers permit the body framework to be relatively light and yet afford a maximum of strength. The floor, being laid directly on the top of the main frame and the extensions thereof provided by the aforesaid fenders and outriggers, will be several inches lower than where the usual wooden sub-sills and cross sills are used. The central location of the driver's seat insures the driver a clear and unobstructed view of the road, while owing to the placement of the passengers well within the forward and rearward confines of the wheel base, there is no overhanging rear body extension to which the driver must turn his attention in going around corners or pulling away from the curb, thus enabling him to keep an eye forward at all times. By balancing the weight of the load both of the body and of the passengers carried therein more nearly within the confines of the wheel base, the strain both on the body and running gear is materially reduced and easier riding qualities at the same time secured.

Where, as in certain standard types of truck chassis construction, the main frame overhangs the rear axle some distance, instead of terminating approximately directly thereover, as shown in Fig. 1, it may be convenient to provide corner brackets 50 entirely independent of the adjacent rear fender members 51 (see Fig. 8). Said corner bracket, in such case will be provided just as before with a socket 52 for the corresponding rear corner post, and the fender member with a socket 53 for the corresponding stanchion 30.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle of the character described, the combination with a main frame, of fender members secured to the corners and constituting extensions thereof, whereon the body of the vehicle may be supported.

2. In a vehicle of the character described, the combination with a main frame, of fender members secured to the corners and constituting extensions thereof, whereon the body of the vehicle may be supported, said fender members projecting both laterally over the wheels and longitudinally beyond the corresponding end of said main frame.

3. In a vehicle of the character described, the combination with a main frame, of fender members secured to the corners and constituting extensions thereof, whereon the body of the vehicle may be supported, said fender members projecting both laterally over the wheels and longitudinally beyond the corresponding end of said main frame, and a transverse bar connecting such longitudinally projecting ends of said fender members.

4. In a vehicle of the character described, the combination with a main frame, of fender members secured to the corners and constituting extensions thereof, whereon the body of the vehicle may be supported, with fender members projecting both laterally over the wheels and longitudinally beyond the corresponding end of said main frame, and a transverse bar connecting such longitudinally projecting ends of said fender members, said bar at the front end of the vehicle constituting a bumper.

5. In a vehicle of the character described, the combination with a main frame, of fender members secured to the corners and constituting extensions thereof, whereon the body of the vehicle may be supported, and brackets projecting laterally from the sides of said main frame intermediately of the corresponding fender members.

6. In a vehicle of the character described, the combination with a main frame, of fender members secured to the corners and constituting extensions thereof, whereon the body of the vehicle may be supported, brackets projecting laterally from the sides of said main frame intermediately of the corresponding fender members, and sockets in said fender members and brackets adapted to receive the stanchions or equivalent elements of the vehicle body.

7. In a vehicle of the character described, the combination with a main frame, of supplemental frame members in the form of skeleton castings including fenders secured to the respective corners of said main frame.

8. In a vehicle of the character described, the combination with a main frame, of fender members secured to the corners and constituting extensions thereof, whereon the body of the vehicle may be supported, and brackets projecting laterally from the sides of said main frame intermediately of the corresponding fender members, the upper surfaces of said fender members and brackets lying substantially in the same plane with the upper surface of said main frame and the floor being built directly thereon.

9. In a vehicle of the character described, the combination with the main frame of a standard automobile chassis carrying an engine at the front end in the usual place, of a chassis extension having frame members attached to the front end of said main frame, and a body supported upon said main frame with its forward end resting on said chassis extension.

10. In a vehicle of the character described, the combination with the main frame of a standard automobile chassis carrying an engine at the front end in the usual place, of a chassis extension unit having frame members attached to the respective sides of said main frame at its forward end, transversely disposed cross members connecting the forward extremities of said frame members, and a body supported upon said main frame with its forward end resting on said chassis extension unit.

11. In a vehicle of the character described, the combination with the main frame of a standard automobile chassis carrying an engine at the front end in the usual place, of a chassis extension unit having frame members attached to the front end of said main frame, a body supported upon said main frame with its forward end resting on said chassis extension, and control elements for said vehicle carried by said chassis extension unit.

12. In a vehicle of the character described, the combination with the main frame of a standard automobile chassis having an engine and radiator located at the front end thereof in the usual place; of forwardly extending frame members attached to the front end of said main frame, a vehicle body supported at its forward end on said members; a driver's seat located over said radiator; a duct for supplying air to said radiator leading under said seat from the front end of said body; and control elements mounted in front of said seat.

Signed by me, this 6th day of April, 1922.

RALPH M. HAWN.